*INVENTORS*
JAMES ARTHUR HIRSCH
ROBERT D. SMITH
BY
ATTORNEY

INVENTORS
JAMES ARTHUR HIRSCH
ROBERT D. SMITH
BY Robert [signature]
ATTORNEY

United States Patent Office 3,461,322
Patented Aug. 12, 1969

3,461,322
ELECTRONIC TIMING CIRCUIT
James Arthur Hirsch, Indianapolis, and Robert D. Smith, Martinsville, Ind., assignors to P. R. Mallory & Co. Inc., Indianapolis, Ind., a corporation of Delaware
Filed Oct. 21, 1965, Ser. No. 499,931
Int. Cl. H03k 17/28
U.S. Cl. 307—293 4 Claims

ABSTRACT OF THE DISCLOSURE

A timing circuit contains a bistable multivibrator which is coupled to and energized by a single half-wave power supply coupled across an alternating current power source. The bistable multivibrator has two states which are the controlling states for the timing circuit. A circuit means having a conducting state corresponding to one of the states of the multivibrator and a nonconducting state corresponding to the other state of the multivibrator is included in the timing circuit. The output of the circuit means operates a unijunction transistor timing circuit for changing the state of the multivibrator and an output circuit for energizing the load when the circuit means is in the nonconducting state. The output circuit utilizes a relaxation oscillator to trigger an alternating current gate-controlled switch.

The present invention relates generally to timing circuits and more particularly to the means and method for providing an all electronic timing and switching circuit for energizing a load for a predetermined time.

There are many applications for an electronic timing circuit which will faithfully energize a load for a determined period of time. Hence, the presence invention is an improved timing circuit which can be readily packaged in a high density manner and which can be operated directly from an alternating current source without the use of a transformer and bridge input.

There is presented herein a timing circuit containing a bistable multivibrator which is coupled to and energized by a simple half-wave power supply consisting of a resistor, diode, and capacitor coupled across an alternating current power source. The bistable multivibrator has two states which are the controlling states for the timing circuit. One of the novel features of the present invention is the operation of such a bistable multivibrator off a half-wave power supply such as the one described above.

A circuit means having a conducting state corresponding to one of the states of the multivibrator and a nonconducting state corresponding to the other state of said multivibrator is included in the timing circuit. The output of said circuit means operates a unijunction transistor timing circuit for changing the state of said multivibrator and an output circuit for energizing a load when the circuit means is in the nonconducting state.

Another novel feature of the present invention is the use of a relaxation oscillator in the output circuit to trigger an alternating current gate-controlled switch. Since the current through the alternating current gate-controlled switch becomes zero each half cycle and the switch turns off, the frequency of the relaxation oscillator is many times line frequency. The relaxation oscillator will supply sufficient current to trigger the alternating current gate-controlled switch without excessive heating and power waste.

It is an object of the present invention therefore, to provide an electronic timing circuit for faithfully energizing a load for a predetermined time.

It is another object of the present invention to provide an electronic timing circuit which can be operated directly from an alternating current power source without the use of a transformer input.

It is a further object of the present invention to provide a bistable multivibrator circuit for controlling a timing circuit which will operate with a half-wave direct current input.

It is still another object of the present invention to provide a timing circuit which will operate an alternating current gate-controlled switch for energizing a load.

It is still another object of the present invention to provide an output circuit for an electronic timer which contains a relaxation oscillator for triggering an alternating current gate-controlled switch.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is a timer comprising: a half-wave power supply coupled directly to an alternating current power source; a bistable multivibrator circuit having a first state and a second state, said multivibrator circuit being coupled to and energized by said half-wave power supply; a circuit means having a nonconducting state when said multivibrator circuit is in said first state and a conducting state when said multivibrator circuit is in said second state, said circuit means being connected to said multivibrator circuit; a timing circuit for changing said multivibrator circuit from said first state to said second state after said circuit means has been in said nonconducting state a predetermined time, said timing circuit being connected across said circuit means; a switching means for changing said multivibrator circuit from said second state to said first state, said switching means being connected to said multivibrator circuit; and an output circuit for energizing a load when said circuit means is in said nonconducting state, said output circuit being coupled across said circuit means.

Figure 1:
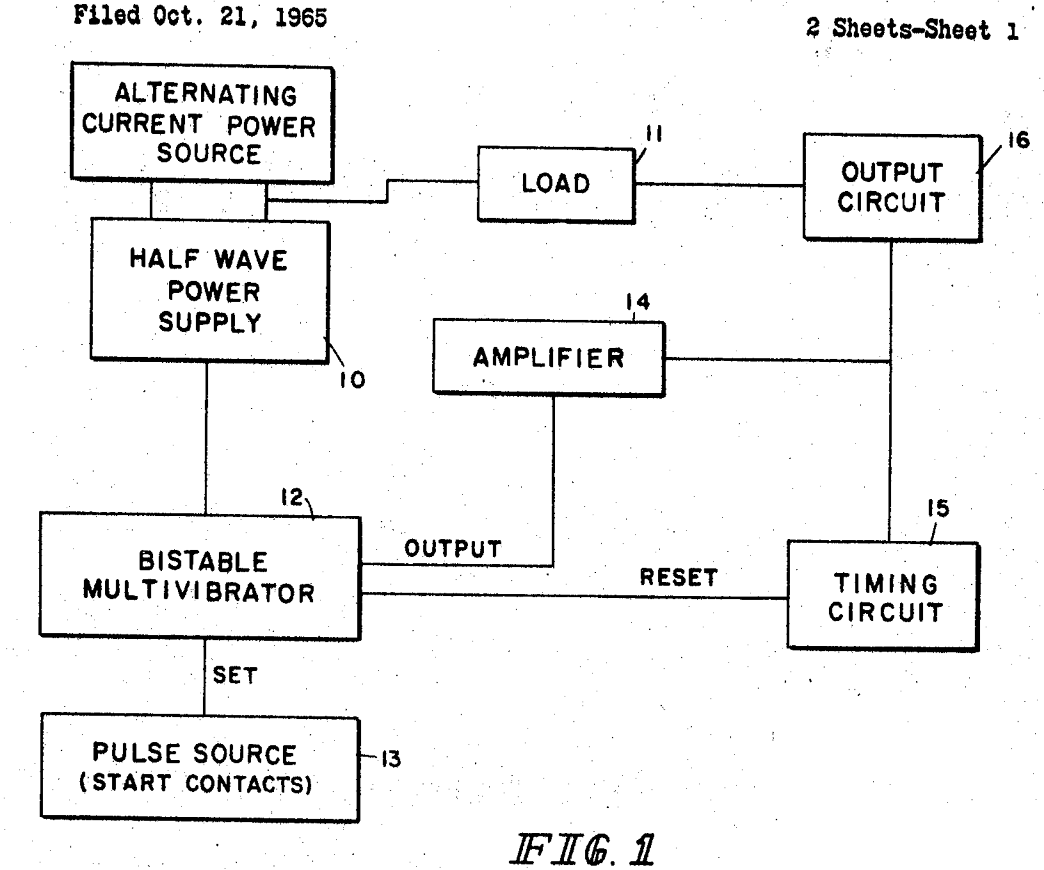
FIGURE 1 is a block diagram for the electronic timer of the present invention.

Referring now to the drawing, and particularly the block diagram of FIGURE 1, the component parts of the timer of the present invention can be visualized in conjunction with the following description. The half-wave power supply 10 is coupled to the input terminals from an alternating current power source. A load 11 is coupled between one side of the alternating current power source and an output circuit 16. A bistable multivibrator circuit 12 is coupled to the half-wave power supply 10 and to an amplifier 14 and a timing circuit 15. A pulse source 13, which is a set of start contacts, are coupled to the bistable multivibrator 12. The amplifier 14 is coupled to the output circuit 16 and the timing circuit 15. The functions of the circuits shown in the block diagram of FIGURE 1 will be discussed later in connection with an operational analysis of the invention.

Figure 2:
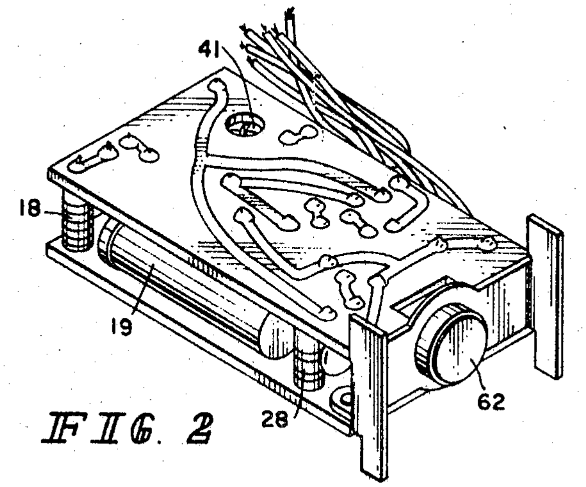
FIGURE 2 is a perspective view of the package containing the electronic timer of the present invention.

Referring now to FIGURE 2 we see a perspective drawing of the package containing the circuitry of the present invention. The purpose of FIGURE 2 is to illustrate how the timer of the present invention has been packaged and tested.

Figures 3, 4:
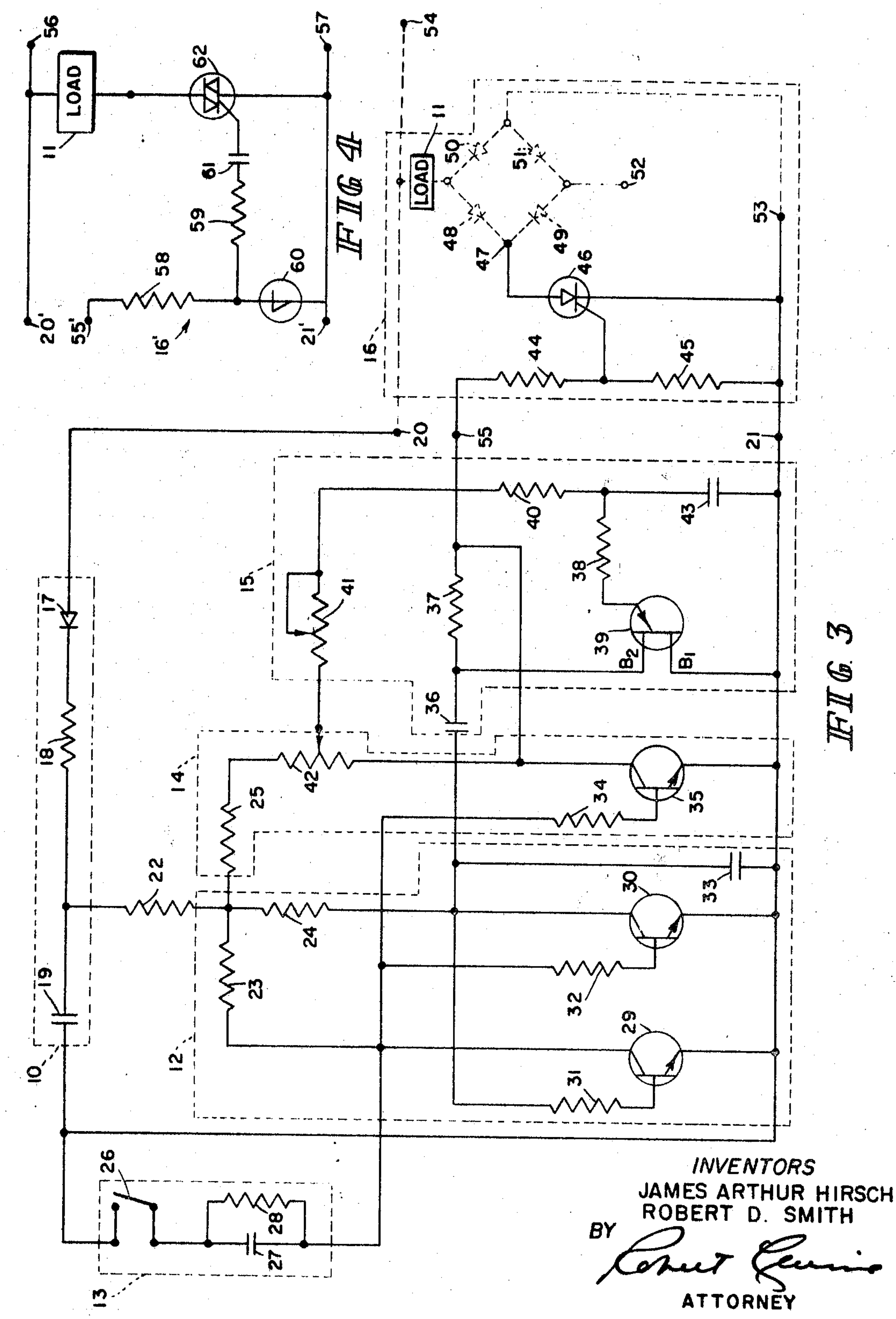
FIGURE 3 is a schematic of an embodiment of the timer which will provide either half-wave or full-wave direct current output for operating the load and which will provide an alternating current output to operate said load.
FIGURE 4 is a schematic of an output circuit containing an alternating current gate controlled switch which can be coupled to the embodiment shown in FIGURE 3.

Referring now to FIGURE 3, we see a schematic of the timer of the present invention. The diode 17, resistor 18 and capacitor 19 comprise the half-wave power supply 10 shown in FIGURE 1, said diode, resistor and capacitor are connected in series with terminal 20 which is one side of an alternating current power source. The capacitor 19 is connected to terminal 21 which is another side of the alternating current power source. A resistor 22 is connected from a midpoint between resistor 18 and capacitor 19 and a common point for resistors 23, 24 and 25. The capacitor 19 is also connected to one side of a switch 26, the other side of said switch being connected to a capacitor 27 and through said capacitor 27 to the resistor 23. A shunt resistor 28 is coupled across the capacitor 27. The resistor 23 is connected to the collector of a transistor 29 and the resistor 24 is connected to a collector of a transistor 30. There is a resistor 31 connected between the base of the transistor 29 and the collector of the transistor 30. There is a resistor 32 connected between the base of the transistor 30 and the collector of the transistor 29. The emitter of the transistors 29 and 30 are directly coupled together and are common with the terminal 21. There is a capacitor 33 coupled across the emitter and collector of the transistor 30. A resistor 34 is coupled directly from the collector of the transistor 29 to the base of a transistor 35. The emitter of the transistor 35 is connected directly to the emitters of the transistors 29 and 30 and the collector of the transistor 35 is connected through an adjustable resistor 42, through the resistor 25 and through the resistor 22 to the common midpoint between the resistor 18 and the capacitor 19. A capacitor 36 is connected between the collector of the transistor 30 and a base-two electrode of an unijunction transistor 39. A resistor 37 is connected from the base-two electrode of the unijunction transistor 39 to the collector of the transistor 35. A resistor 38 is connected from the emitter electrode of the unijunction transistor 39 to a common midpoint between a resistor 40 and a capacitor 43. The other side of the capacitor 43 is connected to a base-one electrode for the unijunction transistor 39. The other side of the resistor 40 is connected through an adjustable resistor 41 to the wiper for the adjustable resistor 42. A terminal 55 is connected to the collector of the transistor 35. The purpose of terminals 20, 21 and 55 is to provide a means for connecting different output circuits 16 to the circuitry shown to the left of said terminals in FIGURE 3.

One type of output circuit 16 is shown connected to the terminals 20, 21 and 55 in FIGURE 3. For purposes of clarification the bridge portion of the output circuit 16 is drawn in dashed lines. A pair of resistors 44 and 45 are coupled across terminals 55 and 21. A gate electrode of a silicon controlled rectifier 46 is connected to a common midpoint between the resistors 44 and 45. The anode electrode of the silicon controlled rectifier 46 is connected to a terminal 47 and the cathode electrode of said silicon controlled rectifier is connected to the terminal 53. A full-wave bridge rectifier comprised of diodes 48, 49, 50 and 51 is connected to the terminals 47 and 53. The inputs to the rectifier are terminals 52 and one side of the load 11. The other side of the load 11 is connected to the terminal 54.

Referring now to FIGURE 4, we see an optional output circuit 16′ which can be coupled to terminals 20, 21 and 55 shown in FIGURE 3. Terminals 20′, 21′ and 55′ shown in FIGURE 4 can be connected respectively with terminals 20, 21 and 55. A resistor 58 is connected from terminal 55′ to the anode of a triggering means, hereinafter referred to as the diode 60. The cathode of the diode 60 is connected to the terminal 21′ and to the terminal 57. A series resistor 59 and capacitor 61 network is connected from the anode of the diode 60 to the gate of an alternating current gate-controlled switch 62. One side of the alternating current gate-controlled switch 62 is coupled to the terminal 57 and the other side is coupled to one side of the load 11. The other side of the load 11 is coupled to terminal 56. Terminals 56 and 57 are inputs from an alternating current power source.

With the above description of components in mind, and by making reference to the drawing figures, the following analysis of operation will serve to convey the functional details of the present invention.

Referring again to FIGURE 3, we can see that the half-wave power supply 10, comprised of capacitor 19, resistor 18 and the diode 17, is connected across an alternating current source applied to terminals 54 and 53. The half-wave power supply 10 provides power for the bistable multivibrator circuit 12, the amplifier 14 and the timing circuit 15.

When power is initially turned on the capacitor 33 which is across the emitter and collector of the transistor 30 of the bistable multivibrator 12 will take time to charge. As a result, the collector voltage on the transistor 30 rises slowly. Since the transistor 29 receives its base current from the collector of the transistor 30 through the resistor 31, the transistor 29 is starved of base current for an instant and is, therefore, off. The voltage at the collector of the transistor 29 does, however, rise quickly when power is turned on and supplies current through the resistor 32 to the base of the transistor 30, thereby causing the transistor 30 to conduct.

When the switch 26 is closed, the capacitor 27 has zero voltage on it. Since the voltage across the capacitor 27 cannot change instantaneously, the voltage across the collector and emitter of the transistor 29 goes to zero and so does the base current to the transistor 30. Hence, the transistor 30 is turned off and the transistor 29 is turned on.

The base of the transistor 35 of the amplifier 14 is coupled through a resistor 34 to the collector of the transistor 29. When the transistor 29 is off, as when power is initially applied and the transistor 30 is on, current flows into the base of the transistor 35 through the resistor 34 causing the transistor 35 to conduct heavily. When the transistor 29 is turned on, as when the switch 26 is closed, the voltage at the collector drops so low that there is no base current for the transistor 35. At that time, the voltage across the collector and emitter of the transistor 35 increases to the point permitted by the voltage divider consisting of the resistors 22, 25 and 42 on one side and the timing circuit 15 and the output circuit 16 on the other side.

The timing circuit 15 is coupled across the collector and the emitter of the transistor 35. The timing circuit 15 is a unijunction transistor timing circuit consisting of the unijunction transistor 39, the resistors 37, 38, 40 and 41 and the capacitor 43. The capacitor 43 is charged to the unijunction triggering voltage through the resistor 40 and the adjustable resistor 41 from a voltage developed at the wiper of the adjustable resistor 42 in the collector circuit of the transistor 35. The timing circuit 15 can be calibrated by adjusting the adjustable resistor 41 to compensate for tolerances in the various components. When the voltage across the capacitor 43 is great enough to trigger the unijunction transistor 39 into conduction, the voltage at the base-two electrode of said unijunction transistor drops abruptly. When the voltage at the base-two electrode of the unijunction transistor 35 drops abruptly, the capacitor 36 which is coupled between said base-two electrode and the collector of the transistor 30 causes the voltage at said collector to drop for an instant below the emitter (common) voltage. As a result, the base current to the transistor 29 decreases to turn said transistor 29 off, thereby turning on the transistor 30 to complete one timing cycle.

The voltage divider network consisting of resistors 44 and 45 is also coupled across the emitter and collector of the transistor 35. The gate electrode of the silicon controlled rectifier 46 is connected to a common midpoint between the resistors 44 and 45. When the transistor 35 is turned off, as when there is a voltage across the timing circuit and it is timing, there is sufficient voltage on the gate of the silicon controlled rectifier 46 to turn it on. When the transistor 35 is conducting there will not be sufficient voltage to turn on the silicon controlled rectifier 46.

The full-wave bridge, consisting of the diodes 48, 49, 50 and 51, is connected to the anode of the silicon controlled rectifier 46 and the terminals 52 and 54 so that alternating current applied across the terminals 52 and 54 is applied to the load 11. On one-half cycle, current flows from the terminal 54 through the load 11, the diode 48, the silicon controlled rectifier 46 and the diode 51 to the terminal 52. On the other half cycle current flows from the terminal 52 through the diode 49, the silicon controlled rectifier 46, the diode 50, and the load 11 to the terminal 54. When the terminal 54 goes positive with respect to the terminal 52, current is suppled to the half-wave power supply 10.

If the load 11 is connected between the terminals 20 and 47 and an alternating current is applied across the terminals 20 and 53, half-wave current will be supplied to the load 11 when the silicon controlled rectifier 46 is turned on.

If the load 11 is connected across the terminals 20 and 47 and a full-wave direct current is applied across the terminals 20 and 53 with the positive signal being applied at terminal 20, the full-wave direct current will be applied across the load 11 when the silicon controlled rectifier is turned on.

Referring again to FIGURE 4, another optional output circuit 16′ can be analyzed. The schematic shown to the left of the terminals 20, 21 and 55 in FIGURE 3 will be the same as in previous discussions except for the values of certain components which must be changed because the output circuit 16′ is no longer a steady drain, forming part of the voltage divider across the transistor 35.

When the transistor 35 is turned off, current will flow through the resistor 58 and the resistor 59 to charge the capacitor 61 which is connected to the gate of the alternating current gate-controlled switch 62 and through the gate junction, which is of low resistance, to the terminal 57. When the voltage across the capacitor 61 reaches the triggering voltage of the diode 60, the diode turns on and a spike of current flows out of the gate of the alternating current gate-controlled switch 62 as the capacitor 61 discharges. This spike of current is sufficient to turn on the alternating current gate-controlled switch regardless of the polarity of the supply voltage. Each half cycle, the current through the alternating current gate-controlled switch becomes zero and the switch turns off. Therefore, the frequency of the gate pulse oscillator network comprised of the resistor 59, the capacitor 61 and the diode 60 must be many times the line frequency applied across the terminals 56 and 57.

It is to be noted that the bistable multivibrator circuit 12 of the present invention is operated by a half-wave direct current power supply 10 directly from an alternating current power source and without a transformer and bridge input. By using the RTL type of multivibrator shown in FIGURE 3, the bistable function is accomplished using transistors rated at low voltage and without appreciable current draw and appreciable heat side effects.

Another feature of the invention which is worthy of note is the use of a relaxation oscillator to trigger the somewhat insensitive alternating current gate-controlled switch 62 shown in FIGURE 4. The alternating current gate-controlled switch 62 requires approximately 50 milliamperes of gate current to assure firing. To supply such current from a resistive divider, such as the resistors 44 and 45 shown in FIGURE 3, would cause excessive heating and power waste in the timer. The relaxation oscillator comprised of the resistor 59, the capacitor 61, and the diode 60 triggers the alternating current gate-controlled switch 62 with minimal current drain.

The switch 26 is a means for changing the state of the bistable multivibrator circuit 12, thereby turning off the amplifier circuit 14 to start the timing circuit 15.

The timing circuit 15 is a means for changing the state of the bistable multivibrator circuit 12 after a predetermined time.

The silicon controlled rectifier 46 is an electronic switching means for energizing the load 11 when the amplified circuit 14 is turned off by the bistable multivibrator circuit 12.

The amplifier circuit 14 is a circuit means having a nonconducting state when the multivibrator circuit 12 is in one state and a conducting state when the multivibrator circuit is in the other state.

What is claimed is:

1. A means for energizing a load for a predetermined time comprising: a half-wave power supply coupled directly to an alternating current power source; a bistable multivibrator circuit having a first state and a second state, said multivibrator circuit coupled to and energized by said half-way power supply; a circuit means having a nonconducting state when said multivibrator circuit is in said first state and a conducting state when said multivibrator circuit is in said second state, said circuit means connected to said multivibrator circuit; a timing circuit for changing said multivibrator circuit from said first state to said second state after said circuit means has been in said nonconducting state a predetermined time, said timing circuit connected across said circuit means; a switching means for changing said multivibrator circuit from said second state to said first state, said switching means connected to said multivibrator circuit; and an output circuit coupled across said circuit means for energizing a load when said circuit means is in said nonconducting state, said output circuit having an alternating current gate-controlled switch in series with said load and a relaxation oscillator including a series resistor and capacitor connected from the anode of a diode to the gate of said alternating current gate-controlled switch for providing triggering pulses to said alternating current gate-controlled switch.

2. A means for energizing a load for a predetermined time according to claim 1 wherein said half-wave power supply comprises a diode, resistor and capacitor connected in series across said alternating current power source.

3. A means for energizing a load for a predetermined time according to claim 1 wherein said circuit means includes a transistor having an emitter electrode, collector electrode and base electrode, said circuit means connected to said multivibrator circuit, said transistor having a nonconducting state when said multivibrator circuit is in said first state and a conducting state when said multivibrator is in said second state.

4. A means for energizing a load for a predetermined time according to claim 3 wherein said timing circuit includes a unijunction transistor connected across said collector and said emitter of said first-named transistor.

References Cited

UNITED STATES PATENTS

| | | | |
|---|---|---|---|
| 2,563,740 | 8/1951 | Parker | 250—27 |
| 3,177,418 | 4/1965 | Meng | 318—331 |
| 3,201,597 | 8/1965 | Balon | 307—252 |
| 3,202,899 | 8/1965 | Gambill et al. | 318—341 |
| 3,281,810 | 10/1966 | Thornberg et al. | 340—213 |
| 3,294,983 | 12/1966 | Draper | 307—88.5 |
| 3,320,440 | 5/1967 | Reed | 307—247 |

ARTHUR GAUSS, Primary Examiner

R. C. WOODBRIDGE, Assistant Examiner

U.S. Cl. X.R.

307—247, 301; 328—72, 77, 129